(12) United States Patent
Payne et al.

(10) Patent No.: US 7,883,615 B2
(45) Date of Patent: Feb. 8, 2011

(54) CONTROLLED ELECTROCHEMICAL DEPOSITION OF POLYSACCHARIDE FILMS AND HYDROGELS, AND MATERIALS FORMED THEREFROM

(75) Inventors: Gregory F. Payne, Cockeysville, MD (US); Li-Qun Wu, North Potomac, MD (US); Reza Ghodssi, Rockville, MD (US); William E. Bentley, Annapolis, MD (US); Gary W. Rubloff, Clarksville, MD (US); Hyunmin Yi, Ellicott City, MD (US); Rohan Fernandes, Beltsville, MD (US); Tianhong Chen, Newark, DE (US); David A. Small, Silver Spring, MD (US)

(73) Assignees: University of Maryland, College Park, College Park, MD (US); University of Maryland, Baltimore County, Baltimore, MD (US)

( * ) Notice: Subject to any disclaimer, the term of this patent is extended or adjusted under 35 U.S.C. 154(b) by 1188 days.

(21) Appl. No.: 10/541,057

(22) PCT Filed: Feb. 11, 2004

(86) PCT No.: PCT/US2004/003878

§ 371 (c)(1),
(2), (4) Date: Sep. 8, 2006

(87) PCT Pub. No.: WO2004/073034

PCT Pub. Date: Aug. 26, 2004

(65) Prior Publication Data

US 2007/0068824 A1    Mar. 29, 2007

Related U.S. Application Data

(60) Provisional application No. 60/446,979, filed on Feb. 12, 2003, provisional application No. 60/446,978, filed on Feb. 12, 2003.

(51) Int. Cl.
    $C25D\ 9/02$    (2006.01)
(52) U.S. Cl. .................. 205/82; 205/317; 205/229; 205/118
(58) Field of Classification Search ............... None
    See application file for complete search history.

(56) References Cited

U.S. PATENT DOCUMENTS

| | | |
|---|---|---|
| 4,148,689 A | 4/1979 | Hino et al. |
| 5,015,576 A | 5/1991 | Nilsson et al. |
| 5,147,698 A | 9/1992 | Cole |
| 5,422,116 A | 6/1995 | Yen et al. |
| 5,474,989 A | 12/1995 | Hashimoto et al. |
| 5,658,592 A | 8/1997 | Tanihara et al. |
| 5,830,459 A | 11/1998 | Cuero et al. |
| 6,044,800 A | 4/2000 | Kubo et al. |
| 6,245,901 B1 | 6/2001 | Von der Osten et al. |
| 6,562,363 B1 | 5/2003 | Mantelle et al. |
| 6,623,950 B1 | 9/2003 | Von der Osten et al. |
| 6,638,621 B2 | 10/2003 | Anderson et al. |
| 2002/0084194 A1 | 7/2002 | Redepenning et al. |
| 2006/0078962 A1 | 4/2006 | Chen et al. |

FOREIGN PATENT DOCUMENTS

| | | |
|---|---|---|
| JP | A 9 239 396 | 9/1997 |
| JP | 310041 | 11/1998 |
| WO | WO 00/11038 | 3/2000 |
| WO | WO 2004/018741 | 3/2004 |

OTHER PUBLICATIONS

Li-Qun Wu, et al., "Chitosan-Mediated and Spatially Selective Electrodeposition of Nanoscale Particles," Langmuir, vol. 21, No. 8, pp. 3641-3646 (2005).

Li-Qun Wu, et al., "Spatially Selective Deposition of a Reactive Polysaccharide Chitosan Layer onto a Patterned Template," Langmuir, vol. 19, No. 3, pp. 519-524 (2003).

Li-Qun Wu, et al., "Voltage-Dependent Assembly of the Polysaccharide Chitosan onto an Electrode Surface," Langmuir, vol. 18, No. 22, pp. 8620-8625 (2002).

Tianhong Chen, et al., "Enzymatic Methods for in Situ Cell Entrapment and Cell Release," Biomacromolecules, vol. 4, No. 6, pp. 1558-1563 (2003).

Mark J. Kkastantin, et al., "Integrated Fabrication of Polymeric Devices for Biological Applications," Invited Paper, Journal of Sensors and Materials, pp. 1-18 (Sep. 2003).

Tianhong Chen, et al., "Nature-Inspired Creation of Protein Polysaccharide Conjugate and Its Subsequent . . . Patterned Surface," Langmuir, vol. 19, No. 22, pp. 9382-9386 (2003).

Rohan Fernandes, et al., "Eletrochemical Induced Deposition of a Polysaccharide Hydrogel onto a Patterned Surface," Langmuir vol. 19, No. 10, pp. 4058-4062 (2003).

Hyunmin, Yi, et al., "A Robust Technique for Assembly of Nucleic Acid Hybridiziation . . . Chitosan," Analytical Chemistry, vol. 76, No. 2, pp. 365-372 (Jan. 15, 2004).

Rohan Fernandes, et al., "Thermo-Biolithography: A Technique for Patterning Nucleic Acids and Proteins," Langmuir, vol. 20, No. 3, pp. 906-913 (2004).

Li-Qun Wu, et al., "Spatially Selective Asembly of a Reactive Polysaccharide Layer onto Patterned Surfaces," Power Point Presentation of Nov. 8, 2002 (22 slides).

Sun et al., Tyronsinase-Containing Chitosan Gels: A Combined Catalysts and Sorbent for Selective Phenol Removal. Biotechnology and Bioengineering, vol. 51, pp. 79-86.

Tatsumi, K. et al., Removal of Phenols from Wastewater by an Enzyme and Chitosan, Advances in Chitin Sciences, vol. 2, pp. 864-869 (1997).

Muzzarelli, et al., TYrosinase-Mediated Quinone Tanning of Chitinous Materials, Carbohydrate Polymers, vol. 24, pp. 295-300 (1994).

Wada et al., "Removal of Phenols and Aromatic Amines from Wastewater by a Combination . . . a Coagulent," Biotechnology and Bioengineering, vol. 45, pp. 304-309 (1995).

Payne et al., "Tyrosinase Reaction/Chitosan Adsorption for Selectively Removing Phenols from Aqueous Mixtures," Biotechnology & Bioengineering, 40, No. 9 (1992).

Seong, et al., "Fabrication of Microchambers Defined by Photopolymerized Hydrogels and Weirs . . . ", Analytical Chemistry, vol. 74, No. 14, pp. 3372-3377, 2002.

Gao, et al., "Lateral Patterning of CdTe Nanocrystal Films by the Electric Field Directed Layer-by-Layer Assembly Method", Langmuir, vol. 18, pp. 4098-4102, 2002.

Chen, et al., "pH-Sensitive Thin Hydrogel Microfabricated by Photolithography", Langmuir, vol. 14, pp. 6610-6612, 1998.

Beebe, et al., "Functional Hydrogel Structures for Autonomous Flow Control Inside Microfluidic Channels", Nature, vol. 404, pp. 588-590, 2000.

Sirkar, et al., "Amperometric Biosensors Based on Oxidoreductases Immobilized in Photopolymerized . . . " Analytical Chemistry, vol. 70, No. 14, pp. 2888-2894, 1998.

Takenaka, et al., "Sol-gel preparation of single-alyer, 0.75 μm thick lead zirconate titanate films . . . ", Applied Physics Letters, vol. 79, No. 21, pp. 3485-3487, 2001.

O'Connor, et al., "Immobilization of neural cells in three-dimensional matrices for biosensor applications", Biosensors & Bioelectronics, vol. 14, pp. 871-881, 2000.

Zhitomirsky, et al., "Cathodic electrodeposition of polymer films and organoceramic films", Materials Science and Engineering, vol. B78, pp. 125-130, 2000.

Chen, et al., "Self-Assembly of Monolayers of Cadmim Selenide Nanocrystals with Dual Color Emission", Langmuir, vol. 15, pp. 6845-6850, 1999.

Clark, "Engineering the Microfabrication of Layer-by-Layer Thin Films", Advanced Materials, 1998.

*Primary Examiner*—Harry D Wilkins, III
(74) *Attorney, Agent, or Firm*—Jeffrey I. Auerbach; Edell, Shapiro & Finnan, LLC

(57) ABSTRACT

A method is provided for electrochemically depositing a polysaccharide mass having a selected physical state. According to an embodiment, an electrically conductive support of a substrate is contacted with an aqueous solution including a selectively insolubilizable polysaccharide, and the selectively insolubilizable polysaccharide is electrochemically deposited on the electrically conductive support while controlling deposition conditions to form the polysaccharide mass having the selected physical state, such as that of a hydrogel. Deposition may be performed in a spatially and/or temporally controlled manner.

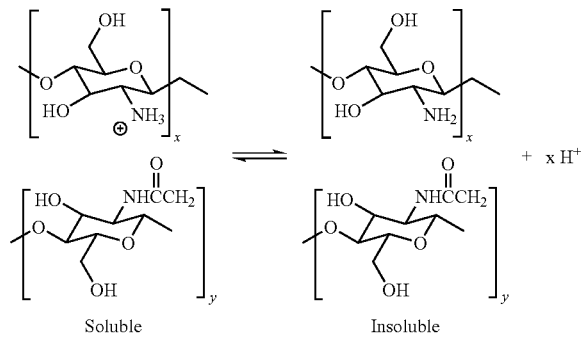

41 Claims, 4 Drawing Sheets

Soluble          Insoluble

US 7,883,615 B2

CONTROLLED ELECTROCHEMICAL DEPOSITION OF POLYSACCHARIDE FILMS AND HYDROGELS, AND MATERIALS FORMED THEREFROM

RELATED APPLICATIONS

This application is a national stage filing under 35 U.S.C. §371 of International Application No. PCT/US2004/003878 filed Feb. 11, 2004, published in English, which claims priority of PCT/US03/40801 filed Dec. 19, 2003, PCT/US03/26356 filed Aug. 22, 2003, U.S. provisional application 60/446,979 filed Feb. 12, 2003, and U.S. provisional application 60/446,978 filed Feb. 12, 2003, the complete disclosures of which are incorporated herein by reference.

GOVERNMENT LICENSING CLAUSE

The U.S. Government has a paid-up license in this invention and the right in limited circumstances to require the patent owner to license others on reasonable terms as provided for by the terms of Grant No. BES-2001-35504-10667 awarded by the United States Department of Agriculture.

BACKGROUND OF THE INVENTION

1. Field of the Invention

This invention relates generally to methods for controlled deposition of polymers (e.g., polysaccharides), and optionally for coupling molecules, including biomolecules, cellular species, and the like to the polysaccharides in deposition. This invention further relates to materials, such as hydrogels, and to devices comprising electrochemically deposited polysaccharides, alone or in combination with coupled molecules.

2. Description of Related Art

The use of micro-electro-mechanical systems (MEMS) in biological research is becoming increasingly common. Micro-devices allow for relatively easy observation and manipulation of individual cells, proteins, or other biological macromolecules. Sample sizes for such experiments may be reduced when using MEMS as compared to traditional techniques. J. D. Trumbull, et al., *IEEE Transactions on Biomed. Eng.* 47, 3 (2000). This allows biological systems to be studied at a new level of resolution while minimizing the materials required for an experiment.

Initially, microfluidic devices were used primarily for capillary electrophoresis. S. Jacobson, et al., *Anal. Chem* 66 (1994) 1114; D. J. Harrison, et al., *Anal. Chem.* 64 (1992) 1926; Z. Liang, et al.; *Anal. Chem.* 68 (1996) 1040. Recently, there has been interest in incorporating a complete array of functional units, e.g., valves, pumps, reaction chambers, etc., onto a single chip to create a lab-on-a-chip (LOC). J. Voldman, et al., *J. Microelectromech. Sys.* 9 (2000) 295; I. Glasgow, et al., *IEEE Transactions on Biomed. Eng.* 48 (2001) 570; T. Fujii, *Microelectronic Eng.*, 61-62 (2002) 907; A. Yamaguchi, et al., *Analytica Chimica Acta.*, 468 (2002) 143; J. H. Kim, et al., *Sensors and Actuators A.* 95 (2002) 108; M. Krishnan, et al., *Curr. Opinion Biotech.* 12 (2001) 92; A. Hatch, et al., *J. Microelectromech. Sys.* 10 (2002) 215.

The ability to create MEMS and other devices such as biosensors and microarrays requires facile methods to precisely control surfaces. A variety of patterning techniques can be used to produce desired structures, while various methods have been investigated to control surface chemistries. For instance, microfabrication techniques are routinely applied to create patterned inorganic surfaces with nanometer to micrometer scale resolution. Xia, Y, et al., *Angew. Chem, Int. Ed. Engl.*, 37, 550-575 (1998).

Two approaches have emerged to extend microfabrication techniques for the creation of patterned surfaces with organic and biological materials. The first approach is based on an extension of photolithography. Bain, C. D., et al., *Angew. Chem., Int. Ed. Engl.*, 28, 506-512 (1989); Whitesides, G. M., Langmuir, 6, 87-96 (1990). Self-assembled monolayers are selectively irradiated to create a pattern of freshly exposed surface, which is then reacted with a bifunctional agent. Reactions include those between thiols and metal surfaces, or between silanes and oxidized silicon. Bain, C. D., et al., *Chem. Int. Ed. Engl/.* 1989,28, 506-512; Whitesides, G. M.,et al., Langm., 6, 87-96 (1990); Sagiv, J. *J. Am. Chem. Soc.* 102, 92-98 (1980); Brzoska, J. B., et al., *Langm.*, 10, 4367-4373 (1994); Allara, D. L., et al., *Langm.*, 11, 2357-2360 (1995).

A first functional group of the agent attaches the agent to the freshly exposed surface, and the second functional group subsequently couples the molecules of interest. Although variations exist, lithography creates the spatial template upon which subsequent coupling occurs. Vossmeyer, T., et al., *Angew. Chem., Int. Ed. Engl.*, 36, 1080-1083 (1997); Vossmeyer, T., et al., *J. Appl. Phys.*, 84, 3664-3670 (1998); Jones, V. W., et al., *Anal. Chem.*, 70, 1233-1241 (1998); Harnett, C. K., *Langmuir,* 17, 178-182 (2001); Jonas, U., et al., *Proc. Natl. Acad. Sci. USA.*, 99, 5034-5039 (2002). This first approach has a drawback associated with the need for photo-sensitive reagents that can be expensive, hazardous and require cumbersome steps to prepare the surface. Furthermore, conventional photolithographic operations require "line-of-sight" and would be difficult to accomplish on internal surfaces in an enclosed microfluidic system. Alternatively, if the lithographic patterning and subsequent biological functionalization are carried out before the microfluidic device is covered to form a closed fluidic environment, the biofunctionality internal to the microfluidic system cannot be readily reprogrammed. Finally, since many biospecies are labile, i.e., sensitive and delicate with respect to their environmental conditions, fabrication processes required to close the microfluidic system may degrade the biospecies.

A second approach for creating patterned surfaces with organic and biological materials is microcontact printing (µCP), in which a soft stamp (typically made of poly-dimethylsiloxane) is created with a preselected pattern. After "inking" the stamp with a solution containing the material to be deposited, the stamp is pressed onto a surface to transfer the pattern. Xia, Y., et al., *Langmuir,* 12, 4033-4038 (1996); Hidber, P. C. et al., *Langmuir,* 12, 1375-1380 (1996). Drawbacks to the microcontact printing approach involve difficulties in stamping with high spatial resolution. Furthermore, the need for direct contact to the surface entails the drawbacks described above for applications to enclosed microfluidic systems. Vaeth, K. M., et al., *Langmuir* 2000, 16, 8495-8500.

Another approach to patterning biomolecules on surfaces is "dip-pen" nanolithography, in which scanning probe microscopy (like atomic force microscopy) is used to write species onto a surface with high lateral resolution. For biomolecular species this is accomplished by transport from the writing tip through a water meniscus to the substrate. While the lateral spatial resolution of this patterning method can be very high (30 nm), patterns must be written in serial fashion, entailing the throughput limitations associated with other direct-write approaches such as electron and ion beam lithographies. In addition, dip-pen nanolithography entails the drawbacks described above for applications to enclosed microfluidic systems. Piner, R. D., et al., *Science* 283, 661-

663 (1999); Jong, S., Mirkin, C. A., *Science,* 288, 1808-1811 (2000); Lyuksyutov, S. F. et. al., *Nature Materials,* 2, 468-474 (July 2003).

Electrophoretic deposition has also been used to assemble colloidal particles and proteins onto electrode surfaces. This approach has been extended to exploit an electric field to direct the spatially selective deposition of CdTe nanocrystals. Gao, M, et al, *Langmuir,* 18, 4098-4102 (2002). In this method, a surface with patterned electrodes is first fabricated, then a combination of an applied voltage and layer-by-layer assembly is used to generate multilayers with spatial resolution in lateral directions. The drawbacks to this assembly approach are that voltages must be maintained to retain the initial layer of nanocrystals, which may not be held to the surface by strong chemical bonds or insolubility. Again, it is not clear whether these layer-by-layer approaches can be extended to enclosed microfluidic channels.

Another drawback to several of the above approaches is that the deposited film provides a non-aqueous microenvironment that is less appropriate than aqueous environments for some sensitive biological systems. Ito, Y., et al., *Langmuir,* 13, 2756-2759 (1997). For example, in the case of proteins, a non-aqueous microenvironment may be denaturing, as proteins tend to unfold, when immobilized, which often causes loss of activity and binding sites that may be dependent upon the three-dimension structure. Thus, hydrogels are often considered for applications involving proteins and nucleic acids, and even intact cells. Burns, M. S., et al., *Science,* 282, 484-487 (1998); Sirkar, et al., *Anal. Chem.,* 70, 2888-2894 (1998); Revzin, A. F., et al., *Langmuir,* 17, 5440-5447 (2001); Revzin, A. F., et al., *Sens. Actuators,* 81, 539-568 (2002); Stenger, D. A., et al., *Trends Biotechnol.,* 19, 304-309 (2001); O'Connor, S. M., et al., *Biosens. Bioelectron,* 14, 871-881 (2000); Reininger-Mack, A., et al., *Trends Biotechnol.,* 20, 56-61 (2002); Koh, W. G., et al., *Langmuir,* 18, 2459-2462 (2002).

SUMMARY OF THE INVENTION

It is an object of the present invention to provide an electrochemical deposition method for controlling the physical state of a polysaccharide deposit.

It is another object of the present invention to provide a method for electrochemically depositing a polysaccharide mass comprising a hydrogel.

It is another object of the present invention to provide a method for controlling the physical state of a deposited polysaccharide mass produced via electrochemical deposition, the polysaccharide mass being capable of coupling to or being capable of manipulation to permit coupling to other molecules, especially biomolecules, cellular species, and the like.

It is still another object of the present invention to provide a method for depositing molecules, especially biomolecules, cellular species, and the like, on a deposited polysaccharide mass.

A further object of the present invention is to conduct the methods for electrochemically depositing a polysaccharide in a spatially and/or temporally controlled manner.

Another object of the present invention is to provide an electrochemically deposited polysaccharide, such hydrogels and hydrogel-containing deposits, alone or coupled to other molecules, especially biomolecules, cellular species, and the like.

To achieve one or more of the foregoing objects, and in accordance with the purposes of the invention as embodied and broadly described in this document, aspects of this invention provide a method for electrochemically depositing a polymer mass, preferably a polysaccharide mass, having a selected physical state. The method comprises contacting an electrically conductive support of a substrate surface with an aqueous solution comprising a selectively insolubilizable polysaccharide. The selectively insolubilizable polysaccharide is electrochemically deposited on the electrically conductive support while controlling deposition conditions to form the polysaccharide mass having the selected physical state.

Also to achieve one or more of the foregoing objects, and in accordance with the purposes of the invention as embodied and broadly described in this document, other aspects of this invention provide a method for selectively depositing of a polymer in spatially localized regions. The method comprises providing a substrate comprising a substrate surface, the substrate surface comprising a patterned electrically conductive portion (support) and an electrically non-conductive portion. The substrate surface is contacted with an aqueous solution comprising a selectively insolubilizable polysaccharide, and the selectively insolubilizable polysaccharide is spatially selectively deposited on the electrically conductive portion in a spatially selective manner.

BRIEF DESCRIPTION OF THE DRAWINGS

The accompanying drawings are incorporated in and constitute a part of the specification. The drawings, together with the general description given above and the detailed description of the certain preferred embodiments and methods given below, serve to explain the principles of the invention. In such drawings.

DETAILED DESCRIPTION OF PREFERRED EMBODIMENTS AND PREFERRED METHODS

Figure 1:
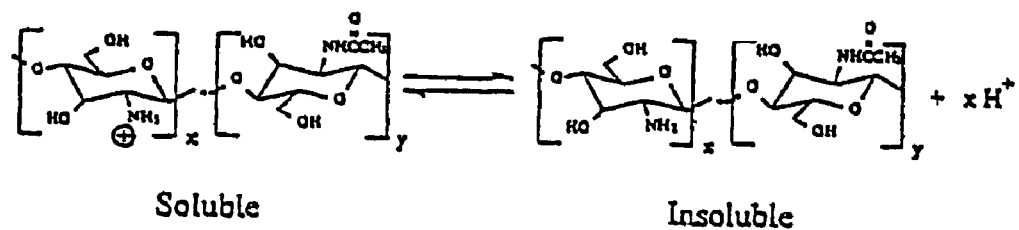
FIG. 1 shows the transformation of the selectively insolubilizable polysaccharide chitosan from a soluble phase to an insoluble phase.

Reference will now be made in detail to the presently preferred embodiments and methods of the invention as illustrated in the accompanying drawings. It should be noted, however, that the invention in its broader aspects is not limited to the specific details, representative assemblies and methods, and illustrative examples shown and described in this section in connection with the preferred embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise.

As used herein and unless otherwise indicated, a "hydrogel" is defined as a semi-solid, multi-component (i.e., two or more component) system comprising a three-dimensional network of one or more species of polymer chains and water fills or substantially fills the space between macromolecules.

Without wishing to be bound by any theory, it is believed that the water is bound in the network by an osmotic effect. Depending on the properties of the polymer (or polymers) used, as well as on the nature and density of the network, such structures in equilibrium can contain various amounts of water. Typically in the swollen state the mass fraction of water in a hydrogel is equal to or higher than the mass fraction of polymer, and often is as high as 80 weight percent, and in some cases as high as 95 weight percent or even 99 weight percent (w/w). Two general classes of hydrogels can be defined:

Physical gels (pseudogels), in which the polymer chains are connected by electrostatic forces, hydrogen bonds, hydrophobic interactions or chain entanglements; such gels are non-permanent and sometimes can be converted to polymer solutions by altering conditions (e.g., heating); and Chemical hydrogels (true or permanent gels) in which covalent bonds link the polymer chains together.

As used herein, a "solid compact film" is defined as a polymer (e.g., polysaccharide) deposit that is free or substantially free of entrapped water.

According to an aspect of the present invention, a method is provided for electrochemically depositing a polymer, such as a polysaccharide, having a selected physical state onto a substrate support, the method comprising: providing a substrate comprising a substrate surface, the substrate surface comprising an electrically conductive support; contacting the electrically conductive support with an aqueous solution comprising a selectively insolubilizable polymer (e.g., polysaccharide); and electrochemically depositing the selectively insolubilizable polymer (e.g., polysaccharide) on the electrically conductive support while controlling deposition conditions to form a polymer (e.g., polysaccharide) mass having the selected physical state.

Substrate and Support

A "substrate" or "wafer" comprises a platform on which an electrically conductive support may be deposited or otherwise formed or provided. The platform may comprise one or more materials, may be homogeneous or heterogeneous, and may contain a surface film. The substrate surface may be flat, curved, multi-leveled, etc., and may optionally include channels (e.g., microchannels), ridges, indentations, protuberances, and the like. The substrate and substrate surface are preferably substantially electrically non-conducting (with the exception of the deposited or otherwise provided electrically conducting support). Substrates may be made of inorganic materials such as, but not necessarily limited to, a silicon wafer optionally having a surface oxide film. Other inorganic materials include silicon oxide, silicon nitride, and the like.

The substrate includes one or more surface portions on which an electrically conductive support is provided. As referred to herein, a surface portion of the substrate means either less than the entire substrate surface, or the entire substrate surface. In the event that the electrically conductive support is provided on some but not the entire substrate surface, the portion of the substrate surface without the electrically conductive support is preferably an electrically non-conductive portion. The electrically conductive support may constitute part of the substrate, may be formed integrally with the substrate, or may be formed on or attached to the substrate surface. The electrically conductive support may include a support surface that is coplanar or not coplanar (offset) with respect to the electrically non-conductive portion of the substrate surface, e.g., as in the case of microchannels.

In embodiments of the invention, the electrically conductive support and electrically non-conductive portion may define a pattern. As referred to herein, a pattern refers to the spatial localization of a material, i.e., so that the substrate surface contains an electrically conductive portion and an electrically non-conductive portion. The pattern may extend from one surface of the substrate to another substrate surface, or may be localized on a single surface or a portion of a single surface. A pattern may comprise a repeating arrangement of objects or shapes, a non-repeating or random arrangement of objects or shapes, a particular defined shape, array, or the like. For example, the pattern may comprise a plurality of parallel lines spaced apart from one another by uniform or non-uniform intervals.

The material or materials selected for the electrically conductive support are preferably those upon which the selectively insolubilizable polysaccharide may be deposited via electrochemical deposition. Suitable materials are electrically conductive, and may include but are not necessarily limited to metals (e.g., aluminum, antimony, cadmium, chromium, cobalt, copper, gold, iron, lead, magnesium, mercury, nickel, palladium, platinum, silver, steel, tin, tungsten, zinc), metal alloys, semiconductors, and conductive polymers (polypyrrole).

Figure 2:
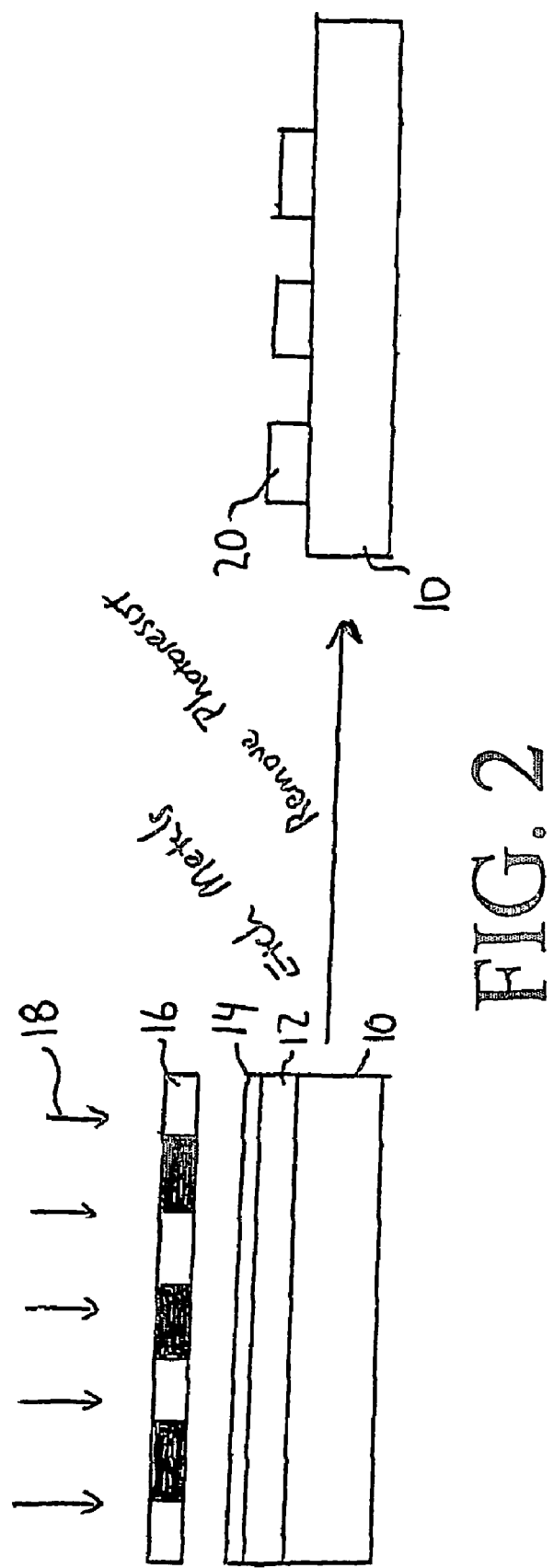
FIG. 2 shows a progression of steps of a microfabrication technique for establishing an electrically conductive, e.g., metal, pattern on a substrate.

Deposition of the electrically conductive support onto the substrate may be accomplished by any known or suitable technique. For example, standard microfabrication techniques may be selected to pattern an electrically conductive material, e.g., gold, onto an electrically insulative substrate. Referring to FIG. 2, there is shown an exemplary yet not necessarily limiting technique for patterning an electrically conductive material on a substrate. In FIG. 2, the selected substrate 10 comprises silicon wafers with a thermal oxide film. A metal layer or layers 12, for example chromium and gold in the illustrated embodiment, are sputtered (simultaneously or consecutively) or otherwise deposited onto the wafer 10 to provide a bi-layer metal structure. Next, the deposited metal is optionally covered with a primer, then a photoresist 14 is applied to the primed metal surface, e.g., via conventional spin-coating techniques. A mask 16 is placed over the photoresist, and the photoresist is then patterned, for example, by exposure of the unmasked portions of the photoresist to UV light 18. The exposed, non-masked areas are then etched with a suitable etchant to develop the sputtered metals into a pattern. The photoresist then is removed, such as with a solvent, e.g., acetone, leaving the patterned sputtered metal support(s) 20 over the substrate 10.

The patterned electrically conductive support serves as a platform for the electric field directed deposition of selectively insolubilizable polysaccharide. It is to be understood that in certain embodiments of the invention, including those elaborated upon below, the phrase "deposit on" or "depositing on" may comprise depositing the selectively insolubilizable polysaccharide indirectly on the patterned electrically conductive support, such as in the case of depositing the selectively insolubilizable polysaccharide onto a predeposited film (e.g., chitosan film) that has already been deposited on the support.

According to this embodiment, the polysaccharide is deposited on the patterned electrically conductive support of the substrate surface, but not the electrically non-conductive portion. Thus, the deposition of the polysaccharide is spatially selective based on the pattern of the electrically conductive support, especially in the case of a deposited solid compact film. It should be understood, however, that due to the semi-solid physical structure of a hydrogel, deposition of a hydrogel at the conductive/non-conductive interface may sometimes spread slightly over the interface, onto the peripheral region of the non-conductive portion.

Polymer—Selectively Insolubilizable Polysaccharide

The compositions of embodiments of the present invention comprise selectively insolubilizable polysaccharides capable of solubilizing in a liquid medium, preferably aqueous, and forming or otherwise depositing an insoluble polysaccharide layer or layers onto an electrically conductive support (or predeposited layers on a support) under effective reaction conditions. As used herein, the term polysaccharide includes starches and polysugars, particularly polymers containing glucosamine residues. Ionizable polysacchides include carboxymethylcellulose, chitosan, chitosan sulfate, pectin, alginate, glycosaminoglycans, ionizable agar, and carrageen. Other synthetic polymers include, for example, polymethacrylic acid, ligninsulfonates, polyvinylsulfonic acid, polyvinylphosphonic acid and polyethyleneimine; similar extracts of plants also may be used. Other suitable polysaccharides include gums from trees, pectins from fruits, starches from vegetables, and celluloses from woody fibers. Chitosan is the preferred ionizable polysaccharide of the present invention.

In preferred embodiments, the selective insolubilization and solubilization of the polysaccharides of the present invention is accomplished by modifying one or more of the polysaccharide ionizable group(s), which may be the same or different. At one or more range(s) of pH the polysaccharide will be soluble in an aqueous solvent ("solubilizing pH ranges"), whereas at one or more other pH values range(s), the polysaccharide will be insoluble (or less soluble), and thus be capable of forming an insoluble mass (e.g., hydrogel and/or compact film) deposited on a support. Suitable ionizable groups include those ionizable at low pH, e.g., capable of forming a positive charge (e.g., alkyl amine groups, primary, secondary or tertiary amine groups, guanidinium groups, imidazole groups, indole groups, purine groups, pyrimidine groups, pyrrole groups, etc.) and those that are ionizable at high pH, e.g., capable of forming a negative charge (e.g., alkoxide groups, carboxyl groups, hydroxy acid groups, phenolic groups, phosphate groups, sulfhydryl groups, etc.). Suitable groups may exhibit multiple pKs, which may be the same (e.g., polyacidic or polybasic) or different (e.g., zwitterionic). For selectively insolubilizable polysaccharides that are ionizable at low pH, amine groups are preferred; for selectively insolubilizable polysaccharides that are ionizable at high pH, carboxyl groups are preferred.

A preferred selectively insolubilizable polysaccharide is chitosan, which is an amine-rich polysaccharide typically derived by deacetylation of chitin or by other processes. Chitin is the second most abundant polysaccharide in nature and is found in crustaceans, insects, and fungi. Chitosan is also commercially available, such as from various suppliers (e.g., Aldrich, Sigma). The term "chitosan," as used herein includes both chitosan polymers and oligomers with complete or substantially complete deacetylation, and chitosan polymers and oligomers with less than complete deacetylation. Chitosan also includes various derivatives of chitosan having the necessary solubility for this invention and at least a portion of the amino functional groups available for reaction.

Chitosan has primary amino groups that have pKa values of about 6.3. At pH's below the pKa, amino groups are protonated making chitosan a water-soluble, cationic polyelectrolyte. At pH's above the pKa of about 6.3, chitosan's amino groups are deprotonated, and the chitosan polymer becomes insoluble. Chitosan's pH-dependent solubility allows the biopolymer to be processed in an aqueous solution, and brought out of solution and formed into various shapes (e.g., beads, membranes, and films) by imparting a modest increase in pH, e.g., to neutrality.

Electrochemical Deposition

A method for depositing a polysaccharide deposit on an electrically conductive support according to an aspect of the present invention will now be described with reference to FIG. 3. It is to be understood that the materials and compositions of this invention are not necessarily produced by the described embodiments and equipment, i.e., other methods and equipment may be used.

Figure 3:
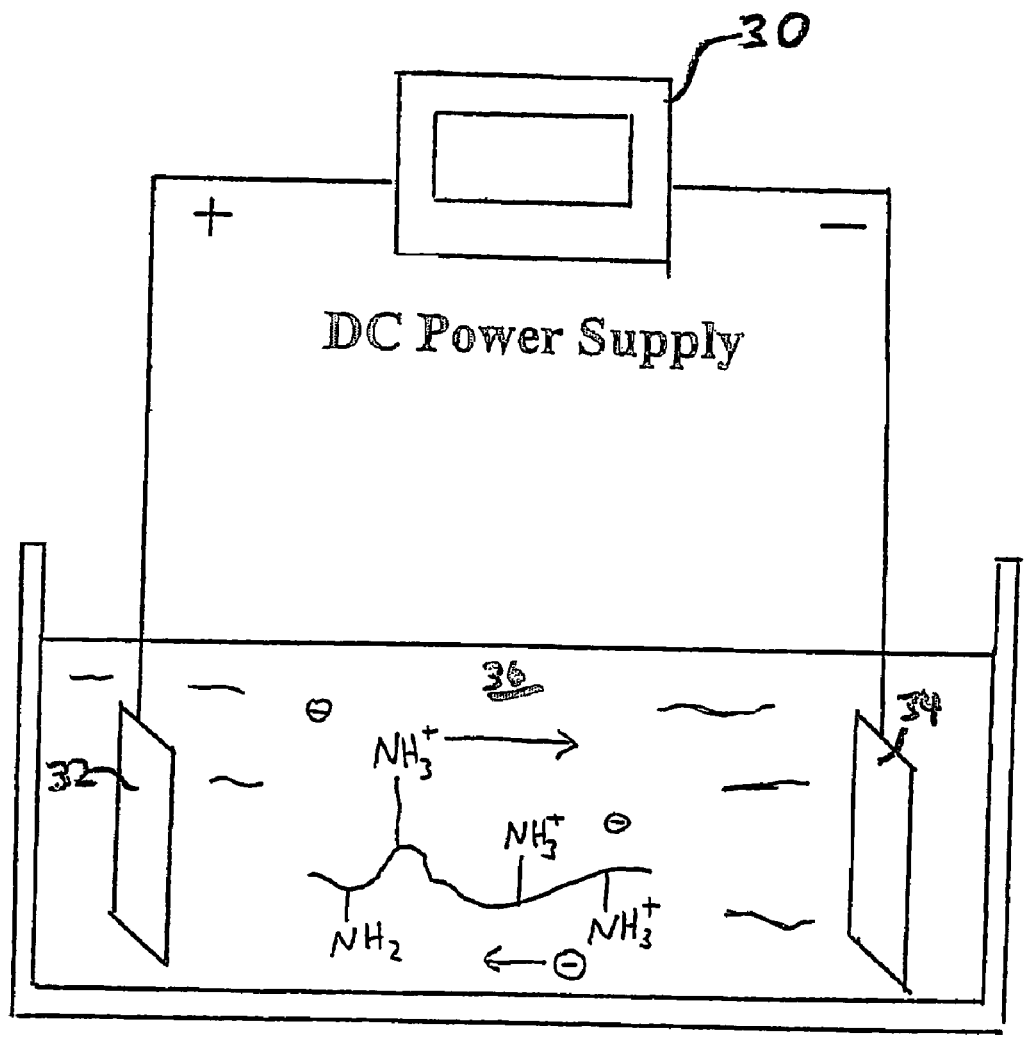
FIG. 3 is a simplified representation of an electrochemical deposition cell for carrying out a method according to an embodiment of the invention.

FIG. 3 shows a suitable electrochemical deposition assembly for depositing the polysaccharide mass onto a non-patterned or patterned substrate. The assembly comprises a power source 30, such as a DC source, and a positive electrode 32 (anode) and a negative electrode 34 (cathode) connected to the power source with appropriate wiring or electrical connections. The electrodes 32 and 34 are immersed in an aqueous solution 36 comprising the selectively insolubilizable polysaccharide, preferably in a solubilized state. Electrodeposition of the polysaccharide is accomplished by application of an electrical voltage between the electrodes 32 and 34.

Chemical deposition of the selectively insolubilizable polysaccharide is preferably electrode selective, providing another degree of control over the process. Polysaccharides containing a group ionizable at a low pH, e.g., capable of forming a positive charge, are attracted to and deposit on the negative electrode. Accordingly, for such polysaccharides the electrically conductive support is polarized to serve as the negative electrode. The shape of the electrically conductive support on which the polysaccharide deposits largely dictates the spatial distribution and localization of the deposited polysaccharide. Positively charged polysaccharides are neither attracted to nor deposit on the positive electrode. The positive (or counter) electrode may be, for example, a non-patterned metal-coated (e.g., gold-coated) silicon wafer. Examples of groups ionizable at a low pH include alkyl amine groups, primary, secondary or tertiary amine groups, guanidinium groups, imidazole groups, indole groups, purine groups, pyrimidine groups, pyrrole groups, etc.

In contrast, a polysaccharide containing a group ionizable at a high pH, e.g., capable of forming a negative charge (e.g., alkoxide groups, carboxyl groups, carboxylate groups, hydroxy acid groups, phenolic groups, phosphate groups, sulfhydryl groups, etc.), is attracted in its soluble state to the positive electrode and deposits on the positive electrode, but not the negative electrode. Accordingly, the electrically conductive support will be polarized to serve as the positive electrode for polysaccharides containing groups ionizable at a high pH.

Various aspects of the electrochemical cell, reaction conditions, and process parameters may be manipulated to control the chemical deposition on the electrically conductive support and the resulting properties and traits of the deposited polysaccharide mass. The physical state of the mass may be, for example, that of a solid compacted film, a semi-solid hydrogel, or a physical state sharing characteristics of both a compacted film and a hydrogel. Generally, reaction conditions and process parameters that have the greatest influence on physical state are the current density, pH, and deposition time. Other process conditions that may also influence the physical state of the deposition include the applied voltage, total ion concentration, polysaccharide concentration, temperature, and the like. Generally, high current densities and pH's relatively near the solubility limit are preferred for formation of hydrogels.

Chitosan Deposition

A method for controlling deposition conditions to form a chitosan film/gel mass with a selected physical state according to an embodiment of the present invention will now be explained in further detail with reference to the polysaccharide chitosan.

The electrodeposition of chitosan is accomplished by application of an electrical voltage between the deposition electrode (e.g., a patterned Au wire) and a counterelectrode while chitosan is in its solubilized state. To solubilize chitosan into solution, an aqueous solution will have a pH less than about 6.3, e.g., 1 to 6.3. The chitosan solution used to deposit chitosan onto the support may have a chitosan content of, for example, about 0.0001 to about 0.001 weight % (grams chitosan/grams solution), about 0.001 to about 0.01 weight %, about 0.01 to about 0.1 weight %, about 0.1 to about 1 weight %, about 1 to about 10 weight %, about 10 to about 20 weight % and about 20 to about 30 weight %. The operational electrical circuit may be controlled by using a controlled constant voltage, a controlled constant current, or a mixture of the two as the deposition proceeds. Using constant voltage there is typically a large current and high deposition rate until an initial chitosan deposit is achieved, after which the current is reduced by the series resistance of the deposited chitosan. Using constant current, the initial voltage is typically small but then increases rather quickly to a nearly constant value as the resistive chitosan deposit develops on the surface.

From its soluble state, the chitosan deposition on the platform, i.e., the negative electrode, can be controlled temporally and spatially based on when and where the voltage is applied, and the shape of the electrically conductive support. The tendency of the depositing chitosan to form a hydrogel (instead of a solid compact film) is increased with use of a pH at or near 6.3, e.g., about 5 to about 5.5, a relatively high current density, e.g., about 20 to about 100 A/m² (e.g., about 50 A/m²), and a relatively high deposition time, e.g., about 2 to about 30 minutes. These variables are interdependent. For example, the tendency that a lower pH may have away from forming a hydrogel may be offset by use of a higher current density and/or deposition time.

Without wishing to be bound by any theory, proton consumption at the cathode surface is partially compensated for by proton generation from the dissociation of water. A pH gradient can be generated adjacent to the cathode surface, depending on the relative rates of hydroxyl ion generation and hydroxyl ion diffusion from the interface region. The generation of a pH gradient at the cathode surface is well-established in electrochemical systems and has been used to explain the anomalous codeposition of metals. Dahms, H. et al., *J. Electrochem. Soc.*, 1965, 112, 771-775; Higeshi et al., *J. Electrochem. Soc.*, 1981, 2081-2085; Hessami, et al., *AIChE J*, 1993, 39, 149-162; Paunovic et al., *Fundamentals of Electrochemical Deposition*, Wiley-Interscience (1998). A pH gradient is established in the immediate vicinity of the cathode surface when a voltage is applied to the electrodes. Depending upon the conditions, the insoluble chitosan chains can form a three-dimensional hydrogel network. It is believed that the hydrogel is deposited as a physical gel. The physical gel may be converted into a chemical gel, for example, by addition of crosslinking agents (e.g., glutaraldehyde), which are discussed in further detail below.

The thickness of the deposited chitosan hydrogel may range, for example, from about 10 microns to about 10 millimeters, or more narrowly about 100 microns to about 5 millimeters. The concentration of the chitosan solution, the voltage and the time a current is applied to deposit chitosan onto a substrate can be varied to control thickness.

The tendency of the depositing chitosan to form a solid compact film is increased with use of a pH of about 5 to about 5.5, a relatively low current density, e.g., about 0.1 to about 10 A/m² (e.g., about 1 A/m² to about 5 A/m², and a relatively short deposition time, e.g., about 1 to about 10 minutes. For example, under typical conditions at a current density 2-5 A/m², the voltage rises within 1 min to slightly over 2 V and remains nearly constant over a total deposition time of 5 min. The deposition process is more reproducible and controllable for constant current mode of electrodeposition of chitosan.

The thickness of the deposited chitosan solid compact film may range from tens of nanometers to micrometers, for example, from about 0.01 to about 3 microns, from about 0.01 to about 1.5 microns, or from about 0.02 to about 0.8 microns.

Multiple Layers

In certain embodiments of the invention, the deposition conditions may be controlled to provide a substantially uniform hydrogel. In other embodiments, the deposition conditions may be controlled to provide a substantially uniform compact film.

According to another embodiment of the present invention, a method is provided for electrochemically depositing a polysaccharide deposit having a selected physical state, comprising: providing a substrate comprising a substrate surface, the substrate surface comprising an electrically conductive support; contacting the electrically conductive support with an aqueous solution comprising a selectively insolubilizable polysaccharide; and electrochemically depositing the selectively insolubilizable polysaccharide on the electrically conductive support while changing deposition conditions to form polysaccharide masses layered or otherwise arranged with respect to one another, each of the masses preferably possessing different physical and/or chemical properties in relation to adjacent layer(s).

The providing, contacting, and electrochemically depositing steps of this embodiment may be performed substantially as explained above with previous embodiments. However, deposition conditions are changed during electrochemical deposition to provide multiple (two or more) layers. For example, operating at a low current density of about 1-5 A/m² may allow for initial deposition of a compact polysaccharide film, after which the current density may be raised to, for example, about 50 A/m² to build a hydrogel layer on the compact polysaccharide film. Two, three, or more layers may be built upon one another in this manner. The interface (or transition) between adjacent layers may be made relatively distinct by rapidly and radically changing the deposition conditions. Alternatively, deposition conditions may be gradually altered during deposition to provide a subtle or blurred transition between adjacent layers.

Stabilization

In a preferred embodiment of the invention, the selectively insolubilizable polysaccharide mass deposited on the electrode(s) is stabilized (or destabilized) by pH adjustment, such as by washing the deposited polysaccharide with a liquid selected from water, a solution of neutral pH, a basic solution, and an acidic solution. In the case of a polysaccharide containing a group ionizable at a low pH, e.g., capable of forming a positive charge (e.g., amine groups), moderate increases to the pH above the pKa of the selectively insolubilizable polysaccharide will increase the insolubility of the deposited polysaccharide and improve stabilization, establishing a stable polysaccharide mass that optionally may be removed from the negative electrode. On the other hand, lowering the pH of the positively charged ionizable polysaccharide will lead to destablization. In contrast, in the case of a polysaccharide containing a group ionizable at a high pH, e.g., capable of forming a negative charge (e.g., a carboxyl group), lowering the pH below the pKa of such selectively insolubilizable polysaccharide will improve stabilization, whereas raising pH will lead to instability.

For example, washing an acidic, soluble chitosan deposited mass with a base neutralizes and deprotonates the chitosan, converting the chitosan into an insoluble, stable hydrogel. Suitable bases include sodium hydroxide, ammonium and organic bases. The chitosan masses are stabilized by neutralization, permitting the chitosan to be retained on the electrode surface in the absence of an applied voltage. On the other hand, washing the chitosan deposited mass with an acid to lower the pH below the pKa will dissolve the mass.

The deposited chitosan mass may possess a high amine group concentration. By estimate, the concentration of amine groups in a chitosan hydrogel may range from $10^{24}/m^3$ to $10^{26}/m^3$ (e.g., $7 \times 10^{25}$ amine/$m^3$), preferably in a substantially homogeneous distribution. A deposited chitosan compact film may possess a high amine group concentration of about $10^{14}$-$10^{15}/cm^2$, e.g., $10^{14}/cm^2$, preferably in a substantially homogeneous distribution. The chitosan may include N-acetylglucosamine residues and/or blocks, preferably in a concentration of less than 40 weight percent, more preferably less than 30 weight percent.

Conjugation and Crosslinking

In accordance with another aspect of the invention, the selectively insolubilizable polysaccharide deposits may serve as templates for surface-controlled bonding and reaction of the molecules, such as biomolecular and cellular species (eukaryotic or prokaryotic) (e.g., proteins (especially enzymes, receptors, receptor ligands, and antibodies) and nucleic acids (especially DNA and RNA), for example in microfluidic systems). The selectively insolubilizable polysaccharide deposits of the present invention may be modified to facilitate their ability to stably conjugate with other molecules. Additionally or alternatively, the other molecules may be modified to facilitate their ability to stably conjugate with the selectively insolubilized polysaccharide deposits of this invention.

Such modifications may include covalent cross-linking agents (e.g., dialdehydes (such as glutaldehyde, formaldehyde, glyoxal), anhydrides (such as succinimide, carbodiimide, dicyclohexylcarbodiimide, etc.), genipin, amino acids, etc.) or non-covalent crosslinking agents (such as tripolyphosphate (TPP), etc.). In one embodiment, such molecules will be nonspecifically divalent or multivalent, possessing two or more identical reactive groups that can be used to conjugate the polysaccharides of the present invention to other molecules (e.g., glutaraldehyde, lysine, arginine, glutamate, aspartate, polysaccharides, etc.). In another embodiment, such molecules will comprise two or more different relevant reactive groups such that an orthogonal synthetic approach may be employed. Examples of such compounds include amino acids. The carboxyl group of such compounds can be conjugated to the amine group of, for example, chitosan, to yield a free, and more sterically accessible, amino group that can be conjugated to the carboxy group of a glutamate or aspartate residue of a protein. Likewise, the polysaccharides of the present invention can be modified to contain chloromethylbenzyl or trialkylsulfoniumbenzyl groups that can then react with the carboxyl group of other molecules.

Modifications may optionally be conducted enzymatically. Any of a variety of enzymes may be used for this purpose. Such enzymes may be used to activate a chemical group of a protein or other ligand so as to facilitate its reaction with a chemical group of the polysaccharide polymer. For example, tyrosinase enzymes, phenol oxidases, and polyphenol oxidases, as well as peroxidase enzymes and laccase enzymes may be employed to react with the tyrosine residues of a protein so as to facilitate the covalent bonding of the tyrosine phenolic oxygen to an amine group of chitosan.

The specific activity of the enzyme used will determine how much of the enzyme should be added. As an illustration, for a mushroom tyrosinase enzyme, a convenient level is from about 1 to about 200 U/mL, preferably about 20 to 100 U/mL, and most preferably about 60 U/mL. Higher amounts of the enzyme may result in depletion of the phenolic compound or of molecular oxygen in the solution. The reaction is then allowed to proceed, conveniently with stirring overnight.

Owing to the flexibility of the chemistry involved, any of a wide variety of different compounds can be conjugated to the polymer. Such compounds particularly include proteins (especially enzymes, receptors, receptor ligands, or antibodies) and nucleic acid molecules (especially DNA or RNA). Depending upon the particular compound selected, conjugation may occur before or after (or both) deposition of the selectively insolubilizable polysaccharide mass onto the substrate.

For example, chitosan possesses amino groups that confer nucleophilic properties to the polymer. Specifically, the deprotonated amino groups have an unshared electron pair that can undergo reaction with a variety of electrophiles. As a result, various chemistries can be exploited to crosslink chitosan and to graft (or conjugate) substituents onto the polymer. The substituent may be coupled to the chitosan and deposited from solution. Alternatively, the substituent may be coupled to the chitosan after the chitosan has been deposited onto the negative electrode. The substituent may comprise various molecules, such as labile biomolecules. Such biomolecules include, not necessarily by limitation, bound protein, enzyme, polynucleotide, RNA, DNA, cells, and the like. The molecules are assembled on the polysaccharide template, which acts as an interface between the molecules and the inorganic substrate.

The conjugated selectively insolubilizable polysacchides of the present invention can be used to provide two-dimensional surface or three-dimensional matrix for molecular interactions. The surface or matrix may be spatially and/or temporally defined.

In one embodiment, the conjugated molecules of such surfaces or matrices will comprise one, two, three or more enzyme species, each of which will preferably but optionally be placed in a spatially and/or temporally discrete region of such surfaces or matrices. Significantly, by incubating such surfaces or matrices in contact with a fluidic layer (i.e., a surface or matrix that contains a flowing or flowable liquid or gas capable of transporting other molecules (e.g., nucleic acid molecules, proteins, enzymatic substrates and/or products, etc.)), multiple stepwise synthetic reactions can be made to occur, either sequentially or in parallel. Suitable enzyme species include: aminopeptidases, angiotensin converting enzymes, caspases, cathepsins, cholinesterases, collagenases, deaminases, endonucleases, endopeptidases, esterases, exonucleases, lipases, nucleotidases, phosphatases, proteases, restriction endonucleases, etc.

In a second embodiment, the conjugated molecules of such surfaces or matrices will comprise one, two, three or more antibody species each of which will preferably be placed in a spatially and/or temporally discrete region of such surfaces or matrices. As used herein, the term "antibodies" is intended to encompass not only conventional immunoglobulins, but also ingle chain antibodies, humanized antibodies, monoclonal antibodies, etc. Significantly, by incubating such surfaces or matrices in contact with a fluidic layer containing antigens, multiple immunoassays can be simultaneously or sequentially conducted. Any of a wide variety of assay formats may be used in accordance with the methods of the present invention. They may be heterogeneous or homogeneous, and they may be sequential or simultaneous. They may be competitive or non-competitive. U.S. Pat. Nos. 5,563,036; 5,627,080; 5,633,141; 5,679,525; 5,691,147; 5,698,411; 5,747,352; 5,811,526; 5,851,778 and 5,976,822 illustrate several different assay formats and applications.

In a third embodiment, the conjugated molecules of such surfaces or matrices will comprise one, two, three or more bound receptor molecule species or bound ligands of receptor molecules each of which will preferably be placed in a spatially and/or temporally discrete region of such surfaces or matrices. Significantly, by incubating such surfaces or matrices in contact with a biological sample, multiple receptor/receptor ligand binding assays can be simultaneously or sequentially conducted. Suitable receptor species include: 5-hydroxytryptamine receptors, acetylcholine receptors, adenosine receptors, adrenoceptor receptors, adrenomedullin receptors, amylin receptors, amyloidreceptors, angiotensin receptors, atrial natriuretic peptide (ANP) receptors, bombesin receptors, bradykinin receptors, calcium-channel receptors, cannabinoid receptors, cgrp receptors, chemokine receptors, cholecystokinin and gastrin (CCK) receptors, corticotropin releasing factor (CRF) receptors, dopamine receptors, endothelin receptors, excitatory amino acid receptors, gaba receptors, galanin receptors, gastric inhibitory peptide (GIP) receptors, GDNF receptors, glucagon receptors, glucagon-like peptide receptors, glycoprotein hormones receptors, growth hormone secretagogue receptors, GTP-binding-protein receptors, hemotopoietin receptors, histamine receptors, imidazole receptors, integrin receptors, interleukin-1 receptors, melanin-concentrating hormone receptors, melanocortin receptors, melatonin receptors, metastin receptors, motilin receptors, neuromedin receptors, neuropeptide FF receptors, neuropeptide Y receptors, neurotensin receptors, opioid receptors, orexin receptors, P2 purinoceptor receptors, parathyroid hormone (PTH) receptors, phosphodiesterase enzyme, platelet activating factor (PAF) receptors, potassium-channel receptors, prolactin receptors, prostanoid receptors, retinoid receptors, selectin receptors, somatostatin receptors, steroid receptors, tachykinin receptors, tumour necrosis factor (TNF) receptors, tyrosine kinase receptors, urotensin II receptors, vasoactive intestinal peptide (VIP) receptors, vasopressin receptors, etc.

In a fourth embodiment, the conjugated molecules of such surfaces or matrices will comprise one, two, three or more bound nucleic acid molecule species, which may be DNA or RNA or be composed of non-naturally occurring residues (e.g., PNA). Such nucleic acid molecules may have defined sequences (such as the sequences of genes or fragments thereof), or may be composed of random or pseudorandom oligonucleotides i.e., nucleic acid molecules of 3-100 nucleotides in length) or polynucleotides (i.e, nucleic acid molecules greater than 100 nucleotides in length). Significantly, by incubating such surfaces or matrices in contact with a biological sample (or an extract thereof), multiple hybridization reactions involving nucleic acid molecules present in the sample can be simultaneously or sequentially conducted. Such hybridization reactions can be used in concert with nucleic acid amplification strategies (such as the polymerase chain reaction (PCR) (e.g., U.S. Pat. Nos. 4,683,202; 4,582,788; U.S. Pat. No. 4,683,194, 6,642,000, etc.)); ligase chain reaction (LCR), self-sustained sequence replication (3SR) (e.g., Guatelli et al., Proc. Natl. Acad. Sci. USA 87:1874-1878 (1990); PCT Publication. WO 88/10315), nucleic acid sequence based amplification (NASBA) (e.g., Kievits, J Virol Methods. 35:273-86 (1991)), strand displacement amplification (SDA) (e.g., U.S. Pat. No. 5,270,184), and amplification with Qβ replicase (Birkenmeyer et al., J. Virological Methods, 35:117-126 (1991); Landegren, Trends Genetics, 9:199-202 (1993); and rolling circle amplification (e.g., U.S. Pat. Nos. 5,854,033; 6,183,960; 5,354,668; 5,733,733)) to accomplish the amplification of the hybridized molecules, or their complements. The present invention permits hundreds, thousands, and tens of thousands of nucleic acid species to be deposited on to such surfaces or matrices.

Additionally, such hybridization reactions may be used to sequence the nucleic acid molecules present in the sample, or to assess the expression profile of the genes of cells present in the biological sample (or an extract thereof) (see, e.g., U.S. Pat. Nos. 6,632,606; 5,002,867; 5,202,231; 5,888,819; Lipshutz et al., Biotechniques, 9(3):442-447 (1995) and Chee et al., Science, 274:610-614 (1996); DeRisi, J. et al. (1996) "USE OF A cDNA MICROARRAY TO ANALYSE GENE EXPRESSION PATTERNS IN HUMAN CANCER" Nature Genetics 14:457-60; Luo, L. et al. (1999) "GENE EXPRESSION PROFILES OF LASER-CAPTURED ADJACENT NEURONAL SUBTYPES" Nature Medicine 5:117-22; Bonner, R. F. et al. (1997) "LASER CAPTURE MICRODISSECTION: MOLECULAR ANALYSIS OF TISSUE" Science 278:1481,1483; Schena, M. et al. (1995) "QUANTITATIVE MONITORING OF GENE EXPRESSION PATTERNS WITH A COMPLEMENTARY DNA MICROARRAY" Science 270:467-70).

In a fifth embodiment, the conjugated molecules of such surfaces or matrices will comprise one, two, three or more non-ionizable polysaccharides or other polymer molecules each of which will preferably be placed in a spatially and/or temporally discrete region of such surfaces or matrices. Significantly, this aspect of the present invention permits one to accomplish the spatial and/or temporal selective deposition of polymers that are not readily amenable to direct spatial and/or temporal deposition onto a surface or matrix. Thus, for example, the present invention permits one to accomplish the spatial and/or temporal selective deposition of polymers such as: aramids, celluloses, kevlars, nomex, nylons, poly(ether sulfone)s, poly(methyl methacrylate)s, poly(phenylene oxide)s, poly(phenylene sulfide)s, poly(vinyl acetate)s, poly (vinyl chloride)s, poly(vinyl) fluorides, poly(vinylidene chloride)s, poly(vinylidene fluoride)s, polyacrylonitriles, polybutadienes, polycarbonates, polychloroprene, polycyanoacrylates, polydicyclopentadienes, polyesters, polyethylenes, polyimides, polyisobutylenes, polyketones, polypropylenes, polystyrenes, polytetrafluoroethylenes, polyurethanes, polyvinylpyrrolidones, rayons, silicones, starches, etc.

Releasable Trapped Species

According to another embodiment of the invention, the selectively insolubilizable polysaccharide hydrogels may serve as a matrix for entrapping or containing molecules, such as colloidal particles, biomolecular, micelles, vesicles, and cells and cellular species (eukaryotic or prokaryotic), present during the polysaccharide hydrogel deposition process. This structure permits programmable release of trapped molecular species through electrochemistry or chemical/thermal processes (e.g., dissolution of the polymer).

Exemplary Applications

It is contemplated that the deposited hydrogels of the present invention may be used in various settings and environments and as components for various devices, including, for example, biosensors, microarrays, micro electromechanical systems (MEMS), and complex, multi-site biomicrofluidics applications and associated multi-step biochemical reaction sequences, and in drug delivery devices, for example providing a releasable insulin drug delivery device.

The methods and materials of embodiments of the present invention provide numerous benefits and advantages when used MEMS and similar devices. For example, the fabrication technique is relatively simple to practice compared to conventional silicon-based MEMS approaches. Also, the product cost is reduced, both in terms of material cost and processing costs. Additionally, the internal surfaces of the microfluidic MEMS environment of embodiments of the invention are polymeric, making the material surfaces considerably more biocompatible than if they included inorganic semiconductor and metallic surfaces.

Chitosan's and other polysaccharide's pH-responsive properties may be useful in MEMS and similar devices. For instance, the ability to "disassemble" chitosan hydrogels by mild acid treatment suggests their utility as single-use valves or controlled release systems. In this regard, an acidic solution may be introduced into a BIOMEMS channel containing a hydrogel valve in order to dissolve the hydrogen and "open" the valve. In another embodiment, a crosslinked hydrogel having pH responsive swelling properties may be placed in a BIOMEMS channel as a swellable valve. Because chitosan is basic, its pH-responsive swelling properties would complement those properties from acidic gels (i.e., cross-linked chitosan hydrogels would swell at low pH while cross-linked acrylic acid hydrogels swell at high pH). In its non-swollen state, the crosslinked hydrogel will lack the size to valve-off the channel. Introduction of a pH adjusting solution (e.g., an acidic solution for the swollen chitosan hydrogen) into the channel will swell the hydrogel, causing the channel to be closed off by the swollen hydrogel.

The following examples serve to explain and elucidate the principles and practice of the present invention further. These examples are merely illustrative, and not exhaustive as to the scope of the present invention.

EXAMPLES

Examples 1 and 2

Chitosan from crab shells (85% deacetylation) and phosphate-buffered saline (PBS) tablets were purchased from Sigma-Aldrich Chemicals. 5-(and 6-)-Carboxyfluorescein succinimidyl ester (NHS-fluorescein, excitation maximum 495 nm and emission maximum 519 nm) was purchased from Molecular Probes and stored desiccated at $-20°$ C. in a dark container until use. Silicon wafers with 1 µm thick thermal oxide film (four inch diameter) were obtained from MEMC Electronic Materials. The gold and chromium used for sputtering onto the wafer were purchased from Kurt J. Lesker Co. The primer was hexamethyldisilazane (HMDS, Microelectronic Materials). The photoresist (Microposit Photoresist S1813) and developer (Microposit Developer 352) were purchased from Shipley Co. The etchants (TFA for gold and TFD for chromium) were obtained from Transene Co.

Chitosan solutions were prepared by adding chitosan flakes to water and incrementally adding small amounts of HCl to the solution to maintain the pH near 3. After being mixed overnight, the chitosan solutions were filtered to remove undissolved material, and the pH of solution was adjusted using NaOH (1 M). NHS-fluorescein solution was prepared by first dissolving 2.5 mg of NHS-fluorescein in 200 µL of dry dimethylformamide (DMF) and then adding 800 µL of ethanol.

Fluorescently labeled chitosan derivatives facilitate visualization, a labeled chitosan was prepared by reacting a chitosan film with NHS-fluorescein. The chitosan film was made by adding 50 mL of a 0.4% (w/v) chitosan solution (pH 3.0) to 140 mm diameter Petri dishes. The Petri dishes were oven-dried overnight at 45° C., and then the dried films were neutralized by immersion in 1 M NaOH for 3-4 h. After neutralization, the films were washed thoroughly with distilled water and equilibrated with a 0.1 M PBS buffer. This buffer was prepared by dissolving PBS tablets in double distilled $H_2O$ and adjusting the pH to 7.4. The labeling reaction was initiated by adding 20 µL of NHS-fluorescein solution (the DMF/ethanol solution described above) into a Petri dish containing a chitosan film in 35 mL of PBS buffer. After allowing 30 min for reaction, the yellowish-green-colored chitosan films were then rinsed with distilled water and dissolved in a dilute HCl solution (pH=3). For purification, the fluorescein-labeled chitosan was precipitated by adjusting the pH to about 9 using NaOH. The precipitant was then collected and rinsed with distilled water. After purification the fluorescently labeled chitosan was redissolved in a dilute HCl solution and the pH was adjusted to 5.6. To determine the polymer concentration, aliquots of known mass were oven-dried, and the residue was weighed.

The patterned surfaces were fabricated by depositing 150 Å thick chromium and then 2000 Å thick gold films on 4-inch diameter silicon wafers, which had previously been coated with 1 µm thick thermal oxide film. Patterning was achieved using photolithography in which a primer and then photoresist were spin-coated onto the gold surface. After soft-backing the coated wafer at 100° C. for 1 min, a specially designed mask was placed over the surface and the wafer was exposed to UV light (total dosage ~190 $mJ/cm^2$). After 30 seconds of development, the wafer was then hard-baked at 120° C. for 10 min. The exposed areas were then etched away by gold and chromium etchants, and the photoresist was removed using acetone.

For deposition, the patterned wafers were immersed in solutions (pH=5.6, 0.8% (w/w) polymer) containing either fluorescently labeled chitosan or unlabeled chitosan, and the patterned gold surfaces were polarized to serve as negative electrodes. The positive electrode in these experiments was an unpatterned gold-coated silicon wafer. The two electrodes were connected to a dc power supply (model 6614C, Agilent Technologies) using alligator clips. Deposition was performed for 2 min by applying a voltage to achieve current densities of 1-2 $A/m^2$. After deposition, the wafers were removed from the solutions, rinsed for 1 min with deionized water, disconnected from the power supply, and dried at room temperature. After drying, the wafers were immersed in 1 M NaOH for 30 min to neutralize the chitosan. After neutralization, the wafers were rinsed with distilled water and dried at room temperature overnight.

Some experiments were performed in which NHS-fluorescein was reacted with chitosan after the chitosan had been deposited onto the patterned gold surfaces of the wafers. Other experiments were performed in which NHS-fluorescein was reacted with chitosan before the chitosan was deposited onto the patterned gold surface of the wafers. For this study, chitosan was first deposited as described above and the dried wafer was placed in a 140 cm diameter Petri dish with 35 mL of PBS buffer (pH=7.4). The reaction was initiated by adding 20 μL of the DMF/ethanol solution containing NHS-fluorescein. After the reaction was allowed to proceed for 5 min, the wafer was rinsed with distilled water and dried at room temperature overnight.

The patterned wafers were examined using an optical microscope (model FS70, Mitutoyo Corp.), and photographs were taken with this microscope using a digital camera (Nikon DXM 1200). The patterned surfaces were also examined using a fluorescence stereomicroscope (MZFLIII, Leica) using a fluorescence filter set (GFP Plus) with an excitation filter at 480 nm (slit width of 40 nm) and an emission barrier filter at 510 nm. Photomicrographs were prepared from the fluorescence microscope using a digital camera (Spot 32, Diagnostic Instruments).

Example 1 examined the selective deposition of fluorescently labeled chitosan onto a patterned surface. For this example, a silicon wafer was patterned to have two independent sets of gold surfaces. The photomicrographs in the top row of FIG. 4 were obtained using an optical microscope and show the patterns of the two sets of gold surfaces, with the right upper and left upper photomicrographs showing the gold surface patterns before and after deposition, respectively. The bottom row of photomicrographs of FIG. 4 was taken with a fluorescence microscope before and after deposition. The photomicrograph on left of the bottom row of FIG. 4 shows that prior to deposition, no image could be obtained from this patterned surface when a fluorescence microscope was used.

For deposition, the wafer was immersed in a solution containing the labeled chitosan and a negative voltage was applied to the polarizable gold surfaces. After 2 min of deposition, the wafer was removed from the solution, rinsed with deionized water, and then disconnected from the power supply. After neutralization and rinsing, the wafer was dried and then examined. The photographs from the optical microscope (top row of FIG. 4) show only slight differences between the polarizable and non-polarizable sets of gold surfaces. The photographs from the fluorescence microscope in the bottom row of FIG. 4 show dramatic differences with obvious images from the upper set of gold surfaces (which had been polarized to be negative), and no fluorescent images from the non polarized, lower set of gold surfaces. For convenience fluorescence micrographs are shown at two different magnifications (20× and 8×) in FIG. 4.

Figure 4:
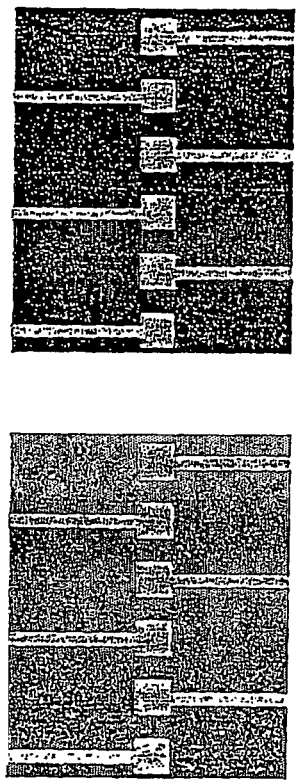
FIG. 4 shows photomicrographs taken of Example 1 described below.
Figure 4:
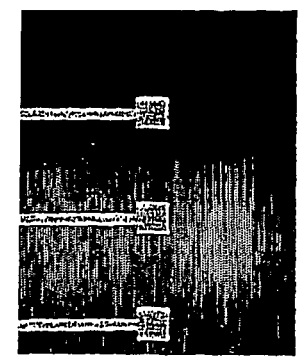
Figure 4:
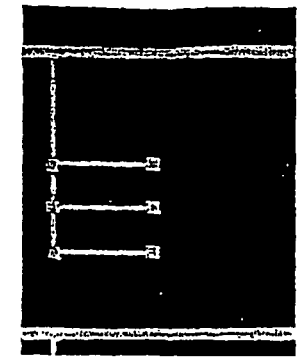

In summary, FIG. 4 shows that the patterned gold surface serves as a platform for the spatially selective deposition of the fluorescently labeled chitosan. Further, no deposition was observed on the unpolarized gold surfaces. Thus, deposition occurs only in response to an applied voltage (or current), indicating that deposition can be controlled temporally and spatially based on when and where the voltage is applied.

In Example 2, unlabeled chitosan was deposited onto a patterned surface and the spatial selectivity was examined for subsequent coupling reactions. For this example, a wafer was patterned to have a variety of gold lines with different widths and different spaces between the lines. The following table lists the dimensions of the various lines and spaces and shows that the lines vary in width from 20 to 1000 μm.

TABLE

| | Line thickness (μm) | | | | |
|---|---|---|---|---|---|
| | 20 | 50 | 100 | 500 | 1000 |
| Space (μm) | 500 | 500 | 500 | 1000 | 1000 |
| | 100 | 100 | 200 | 500 | 500 |
| | 20 | 50 | 100 | 200 | 300 |
| | 10 | 30 | 50 | 50 | 100 |
| | 5 | 10 | 10 | 10 | 50 |

For deposition, this patterned wafer was immersed in a chitosan solution and the gold surface was polarized to be negative for 2 min. After deposition, the wafer was neutralized, rinsed, and dried as described above. Photomicrographs of the region of the wafer patterned with 1 mm wide gold lines spaced 1 mm apart were taken. The optical microscope showed both the lines and spaces in this region. No fluorescence was observed (through the fluorescence microscope) before and after chitosan deposition for the gold-patterned surface (GPS) and for the unlabeled chitosan.

The next step in this example was to contact the wafer with a solution containing NHS-fluorescein. This fluorescein derivative was activated to react with amine groups and should react with any chitosan that had been deposited onto the gold pattern. After the patterned wafer was allowed to react with the NHS-fluorescein solution, the wafer was rinsed with distilled water and dried. The NHS-fluorescein treatment had little effect on the patterned surface when the wafer was examined with an optical microscope. In contrast, the fluorescence microscope showed a distinct fluorescent pattern. This photomicrograph indicated that chitosan had been deposited onto the patterned gold platform, and this "templated" chitosan layer underwent reaction with the amine-reactive fluorescein derivative.

As a control example, the patterned wafer was directly treated with NHS-fluorescein (without prior deposition of chitosan). After this treatment, the wafer was rinsed and dried. The photograph from the optical microscope revealed the distinct gold pattern while no pattern was observed using the fluorescence microscope. These observations demonstrated that there was no reaction between NHS-fluorescein and either the gold or silicon oxide surfaces of the wafer.

To further characterize the spatial selectivity of chitosan deposition and subsequent NHS-fluorescein coupling, several regions of the patterned surface were examined using the fluorescence microscope. Photomicrographs were taken for surfaces with 500 μm wide lines separated by spaces of different widths, i.e., a respective photomicrograph for each of 1000 μm, 500 μm, 200 μm, and 50 μm spacing. For surfaces with 100 μm, 50 μm, and 20 μm wide lines, respective photomicrographs were taken for each of 500 μm and 100 μm width spacing. These photographs showed (upon magnification to 20× or 40×) that the lines were well resolved even when they were separated by only 50 μm or 20 μm.

Example 3

Chitosan from crab shells (85% deacetylation and 370,000 molecular weight, as reported by the manufacturer) was purchased from Sigma-Aldrich Chemicals. Silicon wafers with 1 μm thick thermal oxide film (four inch diameter) were obtained from MEMC Electronic Materials. The gold and chromium used for sputtering onto the wafer were purchased from Kurt J. Lesker Co. The primer was hexamethyldisilazane (HMDS, Microelectronic Materials). The photoresist (Microposit Photoresist S1813) and developer (Microposit Developer 352) were purchased from Shipley Co. The etchants (TFA for gold and TFD for chromium) were obtained from Transene Co.

Chitosan solutions were dissolved in water and HCl was added to adjust the pH to about 1 with stirring till all the flakes dissolved. The pH of the solution was then adjusted to the desired pH of 5 to 5.5 by addition of 1 M NaOH. The solution was then filtered to remove any undissolved debris to obtain the chitosan solution. NHS-fluorescein solution was prepared by first dissolving 2.5 mg of NHS-fluorescein in 200 μL of dry dimethylformamide (DMF) and tehn adding 800 μL of ethanol.

Fluorescently labeled chitosan was prepared by reacting the NHS-fluorescein (5-(and 6)-carboxyfluorescein succinimidyl ester) with chitosan. The chitosan film was made by adding 50 mL of a 0.4% (w/v) chitosan solution (pH 3.0) to 140 mm diameter Petri dishes. The Petri dishes were oven-dried overnight at 45° C., and then the dried films were neutralized by immersion in 1 M NaOH for 3-4 h. After neutralization, the films were washed thoroughly with distilled water and equilibrated with a 0.1 M PBS buffer. This buffer was prepared by dissolving PBS tablets in double distilled $H_2O$ and adjusting the pH to 7.4. The labeling reaction was initiated by adding 20 μL of NHS-fluorescein solution (the DMF/ethanol solution described above) into a Petri dish containing a chitosan film in 35 mL of PBS buffer. After allowing 30 min for reaction, the yellowish-green-colored chitosan films were then rinsed with distilled water and dissolved in a dilute HCl solution (pH=3). For purification, the fluorescein-labeled chitosan was precipitated by adjusting the pH to about 9 using NaOH. The precipitant was then collected and rinsed with distilled water. After purification the fluorescently labeled chitosan was redissolved in a dilute HCl solution and the pH was adjusted to 5.6. To determine the polymer concentration, aliquots of known mass were oven-dried, and the residue was weighed.

The patterned surfaces were fabricated by depositing 150 A thick chromium and then 2000 A thick gold layers on 4 in. diameter silicon wafers, which had previously been coated with a 1 μm thick thermal oxide film. Patterning was achieved using standard photolithography in which a primer and then photoresist were spin-coated onto the gold surface. After soft-backing the coated wafer at 100° C. for 1 min, a specially designed mask was placed over the surface and the wafer was exposed to UV light wavelength (total dosage ~190 $mJ/cm^2$). After 30 seconds of development, the wafer was then hard-baked at 120° C. for 10 min. The exposed areas were then etched away by gold and chromium etchants, and the photoresist was removed using acetone.

For deposition, the patterned surfaces were immersed in solutions containing 1.5% w/w of either fluorescently labeled chitosan or unlabeled chitosan. In all cases, the patterned gold surfaces were polarized to serve as negative electrodes (i.e. cathodes). The anode in these experiments was an unpatterned, highly doped silicon wafer. The two electrodes were connected to a dc power supply (Model 6614C, Agilent Technologies) using alligator clips. Deposition was performed for varying times at varying fixed current densities (galvanostatic conditions). After deposition, the electrodes were disconnected from the power supply and removed from the solutions. The hydrogels were rinsed with double distilled water (DDW). Photographs of the hydrogel were taken using a digital camera (Canon EOS D-60) with a 90 mm lens. The patterned surfaces were also examined with a fluorescence stereomicroscope (MZFLIII, Leica) using a fluorescence filter set (GFP Plus) with an excitation filter at 480 nm (bandwidth of 40 nm) and an emission barrier filter at 510 nm. Photomicrographs were prepared from the fluorescence microscope using a digital camera (Spot 32, Diagnostic Instruments).

The water content of the hydrogels was determined by weighing the material before and after oven-drying overnight at 45° C. The pH of the water within the hydrogel was measured by collecting the hydrogel and compressing it to squeeze out the fluid from the hydrogel matrix. The pH of the collected fluid was measured using a pH meter (Basic Accumet, Fisher Scientific).

Initial experiments were conducted to demonstrate that chitosan-based hydrogels could be deposited onto the cathode surface. In these experiments, a patterned cathode (1.5 $cm^2$) and an anode were immersed in a solution containing fluorescently labeled chitosan (1.5% w/w; pH=5.5) for 20 min, and a current density of 50 $A/m^2$ was maintained. After deposition, the electrodes were disconnected from the power supply and removed from the solution. A chitosan-based hydrogel was deposited on the cathode surface (the gold region below the hydrogel) while small amounts of chitosan were observed to extend onto the unpatterned regions (the dark silicon oxide region of the wafer). The thickness of the deposited hydrogel was estimated to be 5 mm. A top view of the fluorescently labeled hydrogel illuminated using a UV-light source revealed dark spots, which were "pores" that were most probably created by the hydrogen gas bubbles evolved at the cathode surface. From a side view, it was seen that the hydrogel could be inverted and it remained attached to the electrode surface. The results provide visible evidence that chitosan-based hydrogels can be deposited at the cathode surface in response to an applied voltage.

The hydrogels could be stored in distilled water for periods of up to 1 week with no noticeable changes in structure. Longer periods of storage were not investigated. When the hydrogels were stored in air, they were observed to dehydrate over the course of 2-3 days.

Separate experiments were also performed in which unlabeled chitosan (1.5% w/w; pH=5.5) was deposited onto the same electrodes for 1 h at 50 $A/m^2$. After deposition, the water content of the hydrogel was measured to be 98%, indicating that the deposited material is a hydrogel. In another experiment, the deposited material was collected and compressed to squeeze out the fluid from the hydrogel matrix. This fluid was collected and found to have a pH exceeding 11 (beyond the range that can be confidently measured by our pH meter). This pH measurement supports the hypothesis that chitosan hydrogels are deposited in response to a high localized pH near the cathode surface.

To test the hypothesis that hydrogel deposition at the cathode surface results from a high localized pH, the effect of two parameters that would be expected to have a significant effect on deposition (i.e., current density and bulk pH) was investigated. Preferably, the rate of proton consumption will be directly proportional to current density, and thus the pH gradient is expected to become steeper with increased current density. It is desirable for the localized pH to exceed 6.3 in order to ensure that the chitosan becomes insoluble and deposits at the surface. Experimentally, a patterned cathode and an anode were immersed in a solution containing fluorescently labeled chitosan (1.5% w/w) for 2 min. For this study, a region of the cathode containing two parallel gold lines (1 mm wide) separated by a 2 mm space was examined. After deposition, the surface was rinsed and viewed using a fluorescence microscope. The view field appeared uniformly dark if no deposition of the fluorescently labeled chitosan had occurred.

Figures 5A, 5B, 5C:
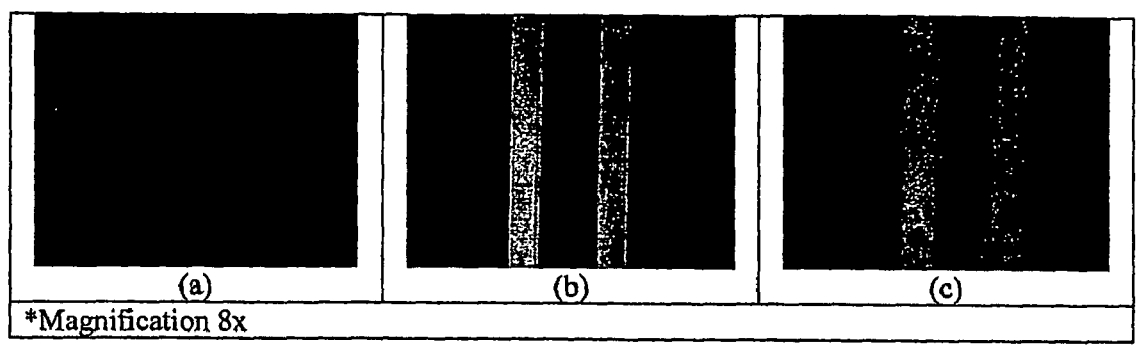
FIGS. 5A to 5C show microphotographs taken for experiments 3A, 3B, and 3C.

In experiment 3A, the bulk solution pH was low (pH=2) and the current density was also low (2 A/m$^2$). Both conditions should suppress chitosan deposition. When the electrode was viewed using a fluorescence microscope, FIG. 5A showed that no chitosan deposition was observed. It should be noted that deposition could be observed under these conditions if longer deposition times were used.

In experiment 3B, the bulk solution pH was increased to 5.5 and the current density was maintained low at 2 A/m$^2$. Under this condition the pH gradient was expected to be shallow although the pH value very close to the cathode surface could exceed a value of 6.3, where chitosan becomes insoluble. FIG. 5B shows that a well-resolved layer of fluorescently labeled chitosan was deposited on the cathode surface.

For experiment 3C, the bulk solution pH was high (pH=5.5) and the current density was also high at 50 A/m$^2$. This condition was expected to yield both a high localized pH and a substantial gradient extending from the cathode surface. FIG. 5C shows that a diffuse deposit was observed and pores resulting from the evolution of gas bubbles were clearly visible. A larger number of pores were expected under this condition because the higher current density leads to greater hydrogen gas evolution. The "diffuseness" of the image in FIG. 5C is consistent with the deposition of a thicker hydrogel under these conditions.

In summary, the results in FIG. 5A to 5C demonstrate that chitosan deposition results from a high localized pH. If conditions do not permit the creation of a region of high localized pH, then no deposition is observed (FIG. 5A). If conditions favor a narrow region of high pH immediately adjacent to the cathode surface, then a thin chitosan deposit is observed (FIG. 5B). Finally, if conditions favor the creation of an expanded region where the pH exceeds chitosan's solubility limit, then chitosan deposits as a thicker, more diffuse hydrogel (FIG. 5C).

A final experiment was performed to suggest a potential use for hydrogel deposition. Specifically, a "patterned" hydrogel was deposited to create a channel and barrier. In this study, a hydrogel was deposited from a solution containing chitosan (1.5% w/w; pH=5.5) onto a patterned cathode consisting of 1 mm wide gold lines separated by a 7 mm space. The deposition was carried out for 20 min at a fixed current density of 50 A/m$^2$. Deposition was found to occur along the electrode lines. Although some hydrogel was observed to extend past the edge of the gold pattern onto the substrate, no deposition occurred in the unpatterned space midway between the two electrodes. In general, it was observed that the lateral resolution of the deposited hydrogel was inversely related to the thickness of the deposit. The thickness of the deposit along each gold line (i.e., the height of the channel walls) was estimated to be 3.5 mm, and the width of the hydrogel was estimated to be 5.5 mm. The width of the channel at the base between the hydrogel walls was estimated to be 1.5 mm.

An interesting, and potentially important, feature of chitosan is that its pH-responsive solubility allows chitosan-based structures to be "disassembled" by a mild acid treatment. To demonstrate the disassembly the cathode surface after the chitosan hydrogel deposit was treated with 1 M HCl for 15 min and then rinsed with distilled water. This treatment completely dissolved the chitosan hydrogel from the surface. Chitosan deposits could also be removed using milder acid treatments if longer times were allowed. The results demonstrate that chitosan hydrogels can be deposited in a spatially selective manner to create semipermanent structures and that these structures can be disassembled.

Example 4

This Example demonstrates the ability of the present invention to immobilize a biological molecule to a polymer (e.g., a polysaccharide such as chitosan) in a manner that retains the biological activity of the molecule. As will be appreciated, such biological activity may be structural in nature (e.g., the binding ability of an antigen, ligand, receptor, antibody, etc. or the capacity of a nucleic acid molecule to hybridize to a complementary molecule) or may be catalytic in nature (e.g., an enzymatic activity, etc.). Where the biological molecule lacks a functional group that is reactive with a reactive group of the polysaccharide, such groups can be added to the molecule using the cross-linking or orthogonal synthesis reagents described above. Additionally, where desired, "spacer" molecules may be employed so as to create a bridge or other extended linkage between the immobilized biological molecule and the polysaccharide. The use of such "spacer" molecules is desirable when steric hindrance concerns exist.

In Example 4, green fluorescent protein (GFP) was examined as a model of a protein with a compact structure. Four of GFP's nine tyrosine residues may be present on the protein's outer surface and therefore may be accessible for tyrosinase-catalyzed oxidation. Specifically studied were the GFP fusion proteins containing a hexahistidine tail at the N terminus ((His)$_6$GFP). Cha H. J., et al., Biotechnol Prog, 15, 283-86 (1999); Cha. H. J., et al., Biotechnol. Bioeng., 67, 565-574 (2000). The His-tail facilitates purification of the fusion proteins. Additionally, a fusion of the (His)$_6$GFP containing 5 tyrosyl residues at the C terminus ((His)$_6$GFP(Tyr)$_5$) was created. The Tyr-tail was designed to increase the number of accessible residues to facilitate tyrosinase-catalyzed activation.

Chitosan was purchased from Sigma and reported by the manufacturer to have a molecular weight of approximately 200,000 and a degree of acetylation of about 15%. Chitosan solutions were prepared by dissolving chitosan in HCl solutions, as described in Chen, T., et al., Biopolymers, 64, 292-302 (2002). Chitosan hydrogels were prepared by pouring a 2% chitosan solution into a small Petri dish and then immersing the dish in a caustic solution (1 M NaOH). After gel formation, the gels were washed extensively with water and PBS buffer. GFP fluorescence was quantified using a PerkinElmer LS55 luminescence spectrometer with an excitation and emission wavelengths of 395 and 509 nm, respectively.

The pHis-GFP plasmid contained a gfp gene inserted into a pTrcHisB (Invitrogen) expression vector and transformed into *Escherichia coli* BL21 (Invitrogen). The pHis-GFP plasmid contained a hexahistidine tail on the N-terminus of gfp, and contained the gene for ampicillin resistance. For this work, a pentatyrosine tail was inserted at the C-terminus of gfp (resulting in pHis-GFP-Tyr) and transformed into *E. coli* BL21 (Invitrogen). Cells were grown to an OD$_{600}$ of 0.6-1.0, induced with 1 M isopropylthiogalactoside (IPTG), grown for an additional 5 h, and then harvested by centrifugation (30 min at 12000 g, Sorval). Pellets were resuspended in 1:50 ratio (by volume) of 1× phosphate buffered saline (PBS) pH 7.4. Aliquots of cell suspension were lysed using sonication. The cell lysate was centrifuged (10 min at 12000 g) to remove insoluble cellular debris and then filtered through a 0.2 μm filter. The cell lysate was then purified using Immobilized Metal Affinity Chromatography (IMAC; AP Biotech Hi-Trap) using the manufacturer's protocol. Fractions with high GFP content were eluted (100 and 300 mM imidazole) and dialyzed (#2 Spectra/Por dialysis tubing) in 1×PBS pH 7.4.

Gold was patterned onto silicon wafers using standard microfabrication techniques. For deposition of the GFP-chitosan conjugate, the patterned surfaces were immersed in a conjugate-containing solution and the patterned gold surfaces were polarized to serve as negative electrodes (i.e., cathodes). The anode in these experiments was an unpatterned gold film on a silicon surface. The two electrodes were connected to a DC power supply (model 6614C, Agilent Technologies) using alligator clips and a fixed current density was maintained for a specified time. The patterned surfaces were examined using a fluorescence stereomicroscope (MZFLIII, Leica) with an excitation filter at 425 nm (bandwidth of 60 nm) and an emission barrier filter at 480 nm.

Conjugation was studied by blending individual fusion proteins (0.17 µg/mL) with chitosan (0.7% w/v), in either the absence ("controls") or presence ("samples") of tyrosinase (60U/mL) under slightly acidic conditions (pH=6). After overnight incubation at room temperature, freshly prepared $NaBH_4$ (6.6 mM final concentration) was added for 1 to 2 hours. Chitosan and conjugates were precipitated by raising the pH with phosphate buffer (pH=9). After centrifugation, the fluorescence of the supernatant was measured. The pellet was washed twice with PBS buffer solution to remove physically bound protein and then resolubilized in aqueous acetic acid solution 0.5 v/v %, pH=4).

Most of the initial fluorescence in the "Controls" remained in the supernatant. The pellet was washed to remove physically bound protein and then resolubilized in aqueous acetic acid. Little fluorescence appeared in the resolubilized pellet for these "Controls". These results indicate that neither the $(His)_6GFP$ nor the $(His)_6GFP(Tyr)_5$ fusion proteins strongly associates with chitosan. Further, the observation that neither fusion protein is conjugated to chitosan in these "Controls" rules out the possibility that auto-oxidation of tyrosine residues leads to conjugation.

The "Samples" were prepared by including tyrosinase in the solutions of the fusion protein and chitosan. A slight browning of these solutions was visually observed and was consistent with an enzymatic oxidation of accessible tyrosyl residues. After overnight incubation at room temperature, the reducing agent sodium borohydride was added, and the "Samples" were incubated for an additional 2 h. (A similar borohydride treatment was performed with the "Controls".) After borohydride treatment, the pH of the solutions was raised to precipitate chitosan and the GFP-chitosan conjugates. Less than half the initial GFP fluorescence remained in the supernatant from these tyrosinase-treated "Samples". The pellet was recovered, washed and resolubilized in an aqueous acetic acid solution. In contrast to the "Controls", substantial fluorescence was observed in the resolubilized pellets for the "Samples". This observation indicates that tyrosinase activates both the $(His)_6GFP$ and the $(His)6GFP-(Tyr)_5$ fusion proteins for conjugation to chitosan. Comparison of the resolubilized pellets for these two "Samples" indicates that the $(His)_6GFP(Tyr)_5$ fusion is more effectively conjugated to chitosan than the (His)6GFP fusion (43 and 24% of the initial fluorescence was observed in the pellets for the (His)6GFP (Tyr)5 and the $(His)_6GFP$ fusions, respectively). This comparison indicates that the Tyr-tail enhances, but is not required for, conjugation. [It should be noted that the sum of the fluorescence of the supernatant plus that of resolubilized pellet is not equal to the initial fluorescence because some fluorescence is lost in washing, and because the intrinsic fluorescence of GFP is reduced at the low pH of the resolubilized pellet.]

Quantitatively, conjugation was performed by reacting 0.02 mg of GFP per gram of chitosan. This is far less than the amount of GFP that would be required to conjugate a single GFP molecule onto each chitosan chain (approximately 100 mg/g would be required for one GFP protein to be added to each chitosan chain). The fluorescence results suggest that the partially purified conjugate contained approximately 0.005 or 0.01 mg of GFP per gram of chitosan, for the $(His)_6GFP$ and $(His)_6GFP(Tyr)_5$ fusion proteins, respectively. The first conclusion is that tyrosinase is required for conjugation of the GFP fusion proteins to chitosan (no conjugation occurs in the "Controls"). Thus, tyrosinase "activates" the fusion protein to initiate covalent conjugation. The second conclusion is that the tyrosinerich fusion tail enhances, but is not required for, GFP conjugation. Presumably the Tyr-tail provides additional accessible tyrosyl residues for tyrosinase-catalyzed activation.

Conjugation to chitosan confers three important properties to GFP. First, the conjugate offers pH responsive (i.e., "smart") properties characteristic of chitosan, i.e., the GFP chitosan conjugate is soluble under acidic conditions but precipitates when the pH is raised above about 6. Fluorescence was observed to precipitate as the pH was raised from 5.5 to 7.2. The GFP chitosan conjugate appears to become insoluble at lower pHs than chitosan (i.e., the solubility of the conjugate is reduced even at a pH of 6). Differences ill solubility between chitosan and the GFP-chitosan conjugate are due to interactions between the chitosan chain and the conjugated GFP. These solubility differences depend on the number of GFP chains grafted to chitosan.

The second property conferred by chitosan to the GFP conjugate is the ability to be covalently immobilized as a hydrogel. This property is illustrated by an experiment in which tyrosinase-containing solution (100 U) was spread onto the surface of a chitosan hydrogel (1.2 cm diameter), after which the solution was allowed to absorb into the gel for 10 minutes. The gel was then immersed in a solution containing $(His)_6GFP(Tyr)5$ (2 mL at 0.32 µg/mL). After incubation, at room temperature overnight, $NaBH_4$ (6.6 mM final concentration) was added and the gel was incubated for an additional 1 to 2 hours, after which the gel was washed extensively with PBS buffer to remove noncovalently bound GFP. This "Sample" retains substantial fluorescence under UV illumination. For the "Control", a chitosan hydrogel without tyrosinase treatment was immersed in a similar $(His)_6GFP(Tyr)_5$-containing solution. After washing, this "Control" gel had little GFP fluorescence.

The third property conferred to GFP by chitosan is the ability to be assembled onto a patterned surface in response to an applied voltage. Chitosan can be deposited onto patterned gold surfaces that have been polarized to serve as the negative electrodes (i.e., as cathodes). Initial studies to demonstrate deposition of the conjugate were performed using a patterned surface having 1 mm wide gold patterns on a silicon oxide surface prepared using standard microfabrication techniques. For deposition, the surface was immersed in a conjugate-containing solution (the concentration of chitosan plus the GFP-chitosan conjugate was 0.6 w/w %, and the pH was 4.9) and one of the gold patterns was polarized to serve as a cathode. After contacting the solution for 40 seconds at a current density of 1.2 $A/m^2$, the surface was rinsed with distilled water and viewed using a fluorescence microscope. The fluorescence micrograph showed that the right-most gold pattern that had been polarized to serve as the cathode is fluorescent, while the control electrode on the left, which was not polarized, was not fluorescent. These results demonstrated that the GFP-chitosan conjugate deposits onto this patterned surface only in response to an applied voltage (no fluorescence is observed on the unpolarized electrode or on the substrate). A separate control was a blend of chitosan and $(His)_6GFP(Tyr)_5$. No GFP fluorescence was observed to deposit on the cathode in this control—thus conjugation was necessary for GFP deposition.

To examine the resolution for deposition of the GFP-chitosan conjugate a silicon wafer that had gold lines of varying widths and varying spacings (e.g., 50 and 500 microns, respectively; 50 and 100 microns, respectively; and 20 and 300 microns, respectively) was immersed into the same conjugate-containing solution and maintained a current density of 2.2 A/m$^2$. The GFP-conjugate was deposited onto patterned gold lines that are separated by distances as small as 100 μm. The conjugate was also deposited onto gold patterns as narrow as 20 microns (this is the resolution limit for fabricating the gold patterns using our optical mask). Spatial control of deposition onto a patterned surface is based on where the gold is patterned on the surface while temporal control of deposition is achieved according to when the voltage is applied.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the appended claims.

What is claimed is:

1. A method for electrochemically depositing a polysaccharide having a selected physical state, onto a substrate surface, wherein said method comprises:
   providing a substrate comprising said substrate surface, said substrate surface comprising an electrically conductive support;
   contacting the electrically conductive support with an aqueous solution comprising a selectively insolubilizable polysaccharide; and
   electrochemically depositing the selectively insolubilizable polysaccharide on the electrically conductive support while controlling deposition conditions to form a polysaccharide mass having a selected physical state deposited onto said substrate surface, wherein the selected physical state comprises that of a hydrogel.

2. The method of claim 1, wherein said electrochemically depositing is conducted at a current density of about 20 A/m$^2$ to about 100 A/m$^2$.

3. The method of claim 1, wherein said electrochemically depositing is conducted at a pH of about 5 to about 5.5.

4. The method of claim 1, wherein said electrochemically depositing is conducted for a deposition time of about 2 minutes to about 30 minutes.

5. The method of claim 1, wherein the selectively insolubilizable polysaccharide comprises an ionizable group that is ionized to provide a positive charge.

6. The method of claim 5, wherein the ionizable group comprises an alkyl amine group, a primary amine group, a secondary amine group, a tertiary amine group, a guanidinium group, an imidazole group, an indole group, a purine group, a pyrimidine group, or a pyrrole group.

7. The method of claim 6, wherein the ionizable group comprises a primary amine group.

8. The method of claim 7, wherein the selectively insolubilizable polysaccharide comprises chitosan.

9. The method of claim 5, further comprising treating the polysaccharide mass with a sufficiently basic solution to stabilize the polysaccharide mass.

10. The method of claim 1, wherein the substrate comprises a non-conducting, inorganic material.

11. The method of claim 10, wherein the substrate comprises silicon.

12. The method of claim 11, wherein the electrically conductive support comprises gold.

13. The method of claim 1, wherein:
   the electrically conductive support is patterned and the substrate surface further comprises an electrically non-conductive portion; and
   said depositing comprises selectively depositing the selectively insolubilizable polysaccharide on the patterned electrically conductive support.

14. The method of claim 13, wherein the patterned electrically conductive support comprises a plurality of parallel lines spaced apart from one another.

15. The method of claim 1, wherein the method further comprises entrapping in the hydrogel at least one member selected from the group consisting of colloids, micelles, vesicles and cells.

16. The method of claim 1, wherein the selectively insolubilizable polysaccharide comprises chitosan.

17. A method for electrochemically depositing a polysaccharide having a selected physical state, onto a substrate surface, wherein said method comprises:
   providing a substrate comprising said substrate surface, said substrate surface comprising an electrically conductive support;
   contacting the electrically conductive support with an aqueous solution comprising a selectively insolubilizable polysaccharide; and
   electrochemically depositing the selectively insolubilizable polysaccharide on the electrically conductive support while controlling deposition conditions to form a polysaccharide mass having a selected physical state deposited onto said substrate surface,
   wherein said controlling of deposition conditions comprises varying the deposition conditions during said electrochemical deposition to provide the polysaccharide mass with a hydrogel portion and a solid compact film portion.

18. The method of claim 17, wherein the hydrogel portion is layered on top of the solid compact film portion.

19. The method of claim 17, wherein said electrochemically depositing is conducted at a current density of about 20 A/m$^2$ to about 100 A/m$^2$.

20. The method of claim 17, wherein said electrochemically depositing is conducted at a pH of about 5 to about 5.5.

21. The method of claim 17, wherein said electrochemically depositing is conducted for a deposition time of about 2 minutes to about 30 minutes.

22. The method of claim 17, wherein the polysaccharide mass comprises a hydrogel, and wherein the method further comprises entrapping in the hydrogel at least one member selected from the group consisting of colloids, micelles, vesicles and cells.

23. The method of claim 17, wherein the substrate comprises a non-conducting, inorganic material.

24. The method of claim 23, wherein the substrate comprises silicon.

25. The method of claim 24, wherein the electrically conductive support comprises gold.

26. The method of claim 17, wherein:
- the electrically conductive support is patterned and the substrate surface further comprises an electrically non-conductive portion; and
- said depositing comprises selectively depositing the selectively insolubilizable polysaccharide on the patterned electrically conductive support.

27. The method of claim 26, wherein the patterned electrically conductive support comprises a plurality of parallel lines spaced apart from one another.

28. The method of claim 17, wherein the selectively insolubilizable polysaccharide comprises chitosan.

29. A method for electrochemically depositing a polysaccharide having a selected physical state, onto a substrate surface, wherein said method comprises:
- providing a substrate comprising said substrate surface, said substrate surface comprising an electrically conductive support;
- contacting the electrically conductive support with an aqueous solution comprising a selectively insolubilizable polysaccharide; and
- electrochemically depositing the selectively insolubilizable polysaccharide on the electrically conductive support while controlling deposition conditions to form a polysaccharide mass having a selected physical state deposited onto said substrate surface, wherein the selectively insolubilizable polysaccharide comprises an ionizable group that is ionized to provide a negative charge.

30. The method of claim 29, wherein the ionizable group comprises an alkoxide group, a carboxyl group, a hydroxy acid group, a phenolic group, a phosphate group, or a sulfhydryl group.

31. The method of claim 30, wherein the ionizable group comprises a carboxyl group.

32. The method of claim 29, further comprising treating the polysaccharide mass with a sufficiently acidic solution to stabilize the polysaccharide mass.

33. The method of claim 29, wherein said electrochemically depositing is conducted at a current density of about 20 $A/m^2$ to about 100 $A/m^2$.

34. The method of claim 29, wherein said electrochemically depositing is conducted at a pH of about 5 to about 5.5.

35. The method of claim 29, wherein said electrochemically depositing is conducted for a deposition time of about 2 minutes to about 30 minutes.

36. The method of claim 29, wherein the polysaccharide mass comprises a hydrogel, and wherein the method further comprises entrapping in the hydrogel at least one member selected from the group consisting of colloids, micelles, vesicles and cells.

37. The method of claim 29, wherein the substrate comprises a non-conducting, inorganic material.

38. The method of claim 37, wherein the substrate comprises silicon.

39. The method of claim 38, wherein the electrically conductive support comprises gold.

40. The method of claim 29, wherein:
- the electrically conductive support is patterned and the substrate surface further comprises an electrically non-conductive portion; and
- said depositing comprises selectively depositing the selectively insolubilizable polysaccharide on the patterned electrically conductive support.

41. The method of claim 40, wherein the patterned electrically conductive support comprises a plurality of parallel lines spaced apart from one another.

* * * * *